INVENTORS
JOHN W. DORSAK & THOMAS F. VAN DENBERG
BY
Oberlin, Maky & Donnelly
ATTORNEYS INVENTORS
JOHN W. DORSAK & THOMAS F. VAN DENBERG
BY
Oberlin, Maky & Donnelly
ATTORNEYS

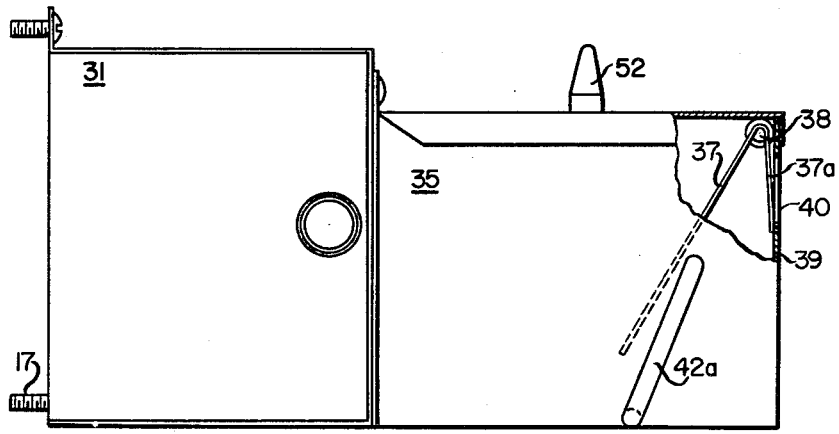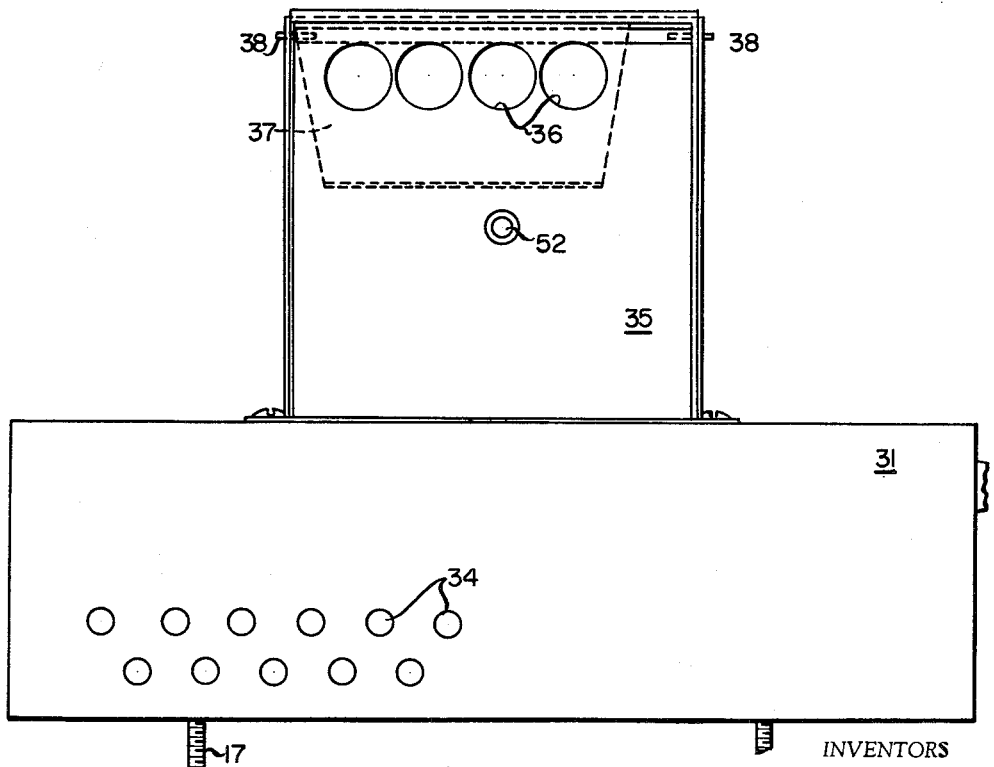

United States Patent Office 3,187,744
Patented June 8, 1965

3,187,744
INCUBATOR
John W. Dorsak, Lyndhurst, and Thomas F. Van Denberg, Chagrin Falls, Ohio, assignors, by mesne assignments, to Air Reduction Company, Incorporated, a corporation of New York
Filed Jan. 31, 1961, Ser. No. 86,181
11 Claims. (Cl. 128—1)

The present invention relates to an incubator and, more particularly, to a baby incubator of improved construction.

An incubator should be capable of supplying a controlled atmosphere for an infant, such as a continuous movement or ventilation of air having a temperature and humidity within predetermined ranges. The present incubator provides an improved construction which realizes such desiderata in a novel manner.

For example, in one form of the invention, the incubator construction provides a flow of air which may be heated as desired and directed toward a water reservoir before entry into that portion of the incubator designed to hold the infant. By diverting an adjustable amount of the air flow over the water reservoir prior to such entry, a variable amount of moisture may be entrained in the air flow to control the relative humidity in the incubator. In addition, the incubator may contain an improved door structure, an anti-fog thermometer guard, and still other desired structural features.

It is therefore a principal object of the present invention to provide an improved incubator construction.

Another object is to provide a method of circulating air in an incubator.

A further object is to provide a method of circulating air in an incubator in which the tray that holds an infant is used to baffle and diffuse the air flow.

A still further object is to provide an incubator containing apparatus for directing the flow of air therein and for controlling the temperature and humidity of such air.

A still further object is to provide a baby incubator having a novel water reservoir for humidifying the air in the incubator.

A still further object is to provide an incubator having an improved door structure.

A still further object is to provide an incubator having an anti-fog thermometer guard.

Other objects of the invention will become apparent as the description proceeds.

To the accomplishment of the foregoing and related ends, the invention consists of the features hereinafter fully described and particularly pointed out in the claims, the annexed drawing and following disclosure describing in detail the invention, such drawing and disclosure illustrating, however, but one or more of the various ways in which the invention may be practiced.

In the accompanying drawings:

FIGURES 8 and 9 are side and plan views, respectively, of the damper and shroud chamber with which the water reservoir is used;

Figure 1:
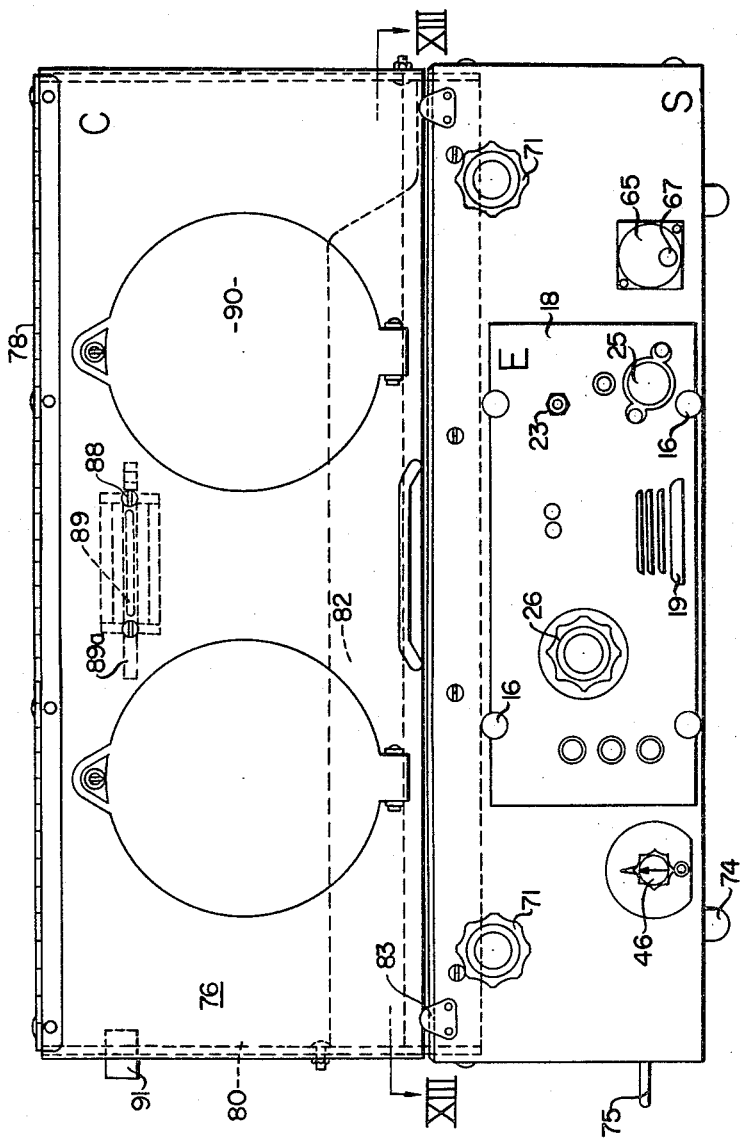
FIGURES 1 and 2 are front and side views, respectively, of an incubator embodying the present invention.

Referring to the drawings, the embodiment illustrated includes a skirt portion S, preferably made of stainless steel metal, and a casing C, preferably fabricated from transparent plastic sheets such as polymethyl methacrylate. The casing C partially telescopes the skirt portion S to rest on a peripheral ledge 15.

Figure 11:
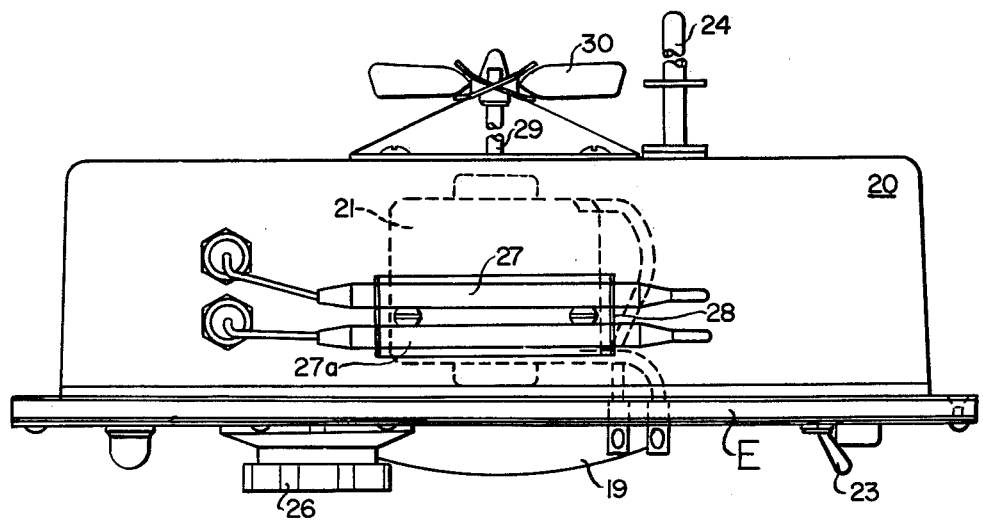
FIGURES 11 and 12 are plan and side views, respectively, of the heating unit for the incubator.
Figure 12:
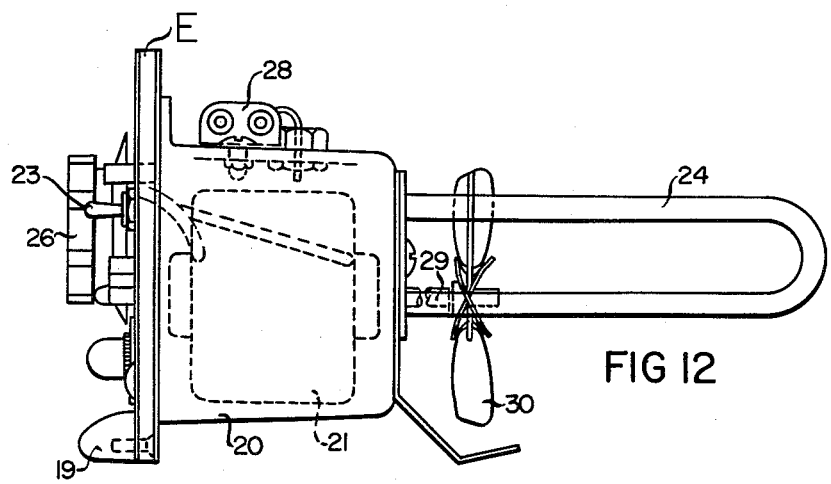

Considering first the skirt portion S and its attendant apparatus, the front wall of the skirt has an opening to receive a pull-out electrical heating unit generally indicated at E and illustrated in greater detail by FIGURES 11 and 12. Threaded nuts 16 engage threaded studs 17 which pass through suitable openings in a control panel 18 of the unit to hold the heating unit in place. A handle 19 facilitates removal and insertion of the heating unit E with respect to the skirt S. The unit E includes a closed compartment 20 containing an electrical motor 21 which is energized by an electrical cable 25 and a toggle switch 23. A standard U-shaped heating coil 24 projects rearwardly from compartment 20 and is energized by the electrical cable 25. The output of the heating coil 24 may be conventionally regulated by a knob 26 which is connected to a thermostat, and the output of the coil maintained at a selected value by thermostat bulbs 27 and 27a held in a cradle 28 atop the compartment 20. Bulb 27 is the controlling thermostat bulb for normal operation. Bulb 27a is a high temperature limiting safety device. In the event bulb 27 functions defectively and continues to call for heat, bulb 27a shuts off the entire heating system when a predetermined temperature is reached. The construction and operation of these electrical parts are known in the art and therefore not here described in detail. A shaft 29 of the motor 21 extends through the back of the compartment 20 to rotate a fan 30.

A shroud housing 31 (FIGURES 8 and 9) is held inside the front wall of the skirt portion S through attachment of the panel 18 by the nuts 16 to the threaded studs 17 fixed to the housing 31. This housing completely encloses the heating unit E and receives outside air through a rubber hose 32 connecting nipples placed in an opening in the shroud 31 and a side wall 33 of the skirt S. Openings 34 at the top of the housing 31 receive returned air from the casing C.

An air chamber 35 communicates with the interior of the housing 31 to receive the heated air impelled therefrom by the fan 30 which can if desired project somewhat into the chamber 35. This air chamber, formed from sheet metal and bolted to the housing 31 (FIGURES 8 and 9) has a series of openings 36 along its upper surface and contains a damper plate 37 folded back on itself as shown particularly in FIGURE 8. Pins 38 project inwardly from the sides of the chamber 35 to support the damper plate 37 for pivotal movement along the axis defined by the fold. It will be noted that the openings 36 and damper plate 37 are stationed to the left in the air chamber 35 (as viewed in FIGURE 9) to accommodate the heating coil 24 which extends along the right-hand side of the air chamber.

Figure 3:
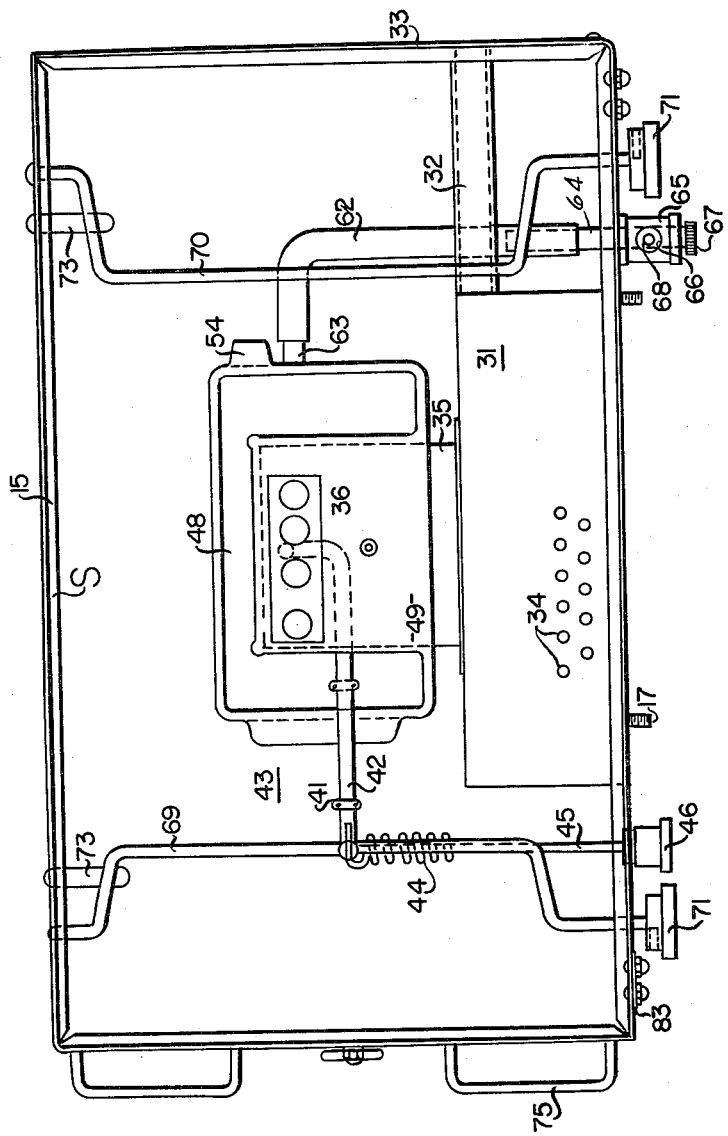
FIGURE 3 is a plan view of a skirt portion of the incubator into which the upper housing portion fits and illustrates the air-heating and water reservoir apparatus.
Figure 10:
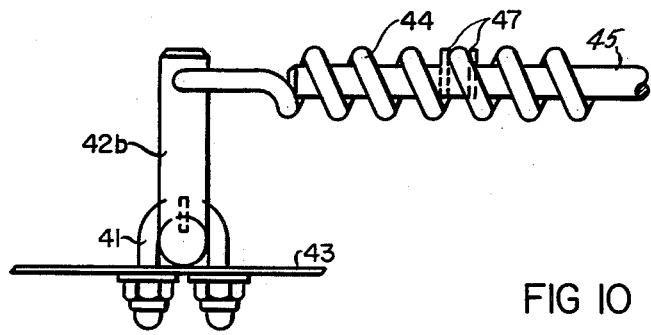
FIGURE 10 is a fragmentary view of controlled means for the damper of FIGURES 8 and 9.

The short fold 37a of the damper plate can bear against a back wall 39 of the air chamber to limit the downward pivoting of the damper plate about the pins 38. In this lowest position of the damper, fold 37a covers a rectangular opening 40 which extends along the wall 39 for a distance about equal to the width of the damper plate 37. However, the position of the plate 37 can be regulated to proportion the amount of heated air flowing through the openings 36 and the rectangular opening 40. Referring principally to FIGURES 3 and 10, U-bolts 41 hold an actuating arm 42 loosely for rotation on a support plate 43 suitably mounted within the skirt S and below the ledge 15. The ends of the arm 42 are turned, end 42a being adapted to engage and pivot the damper 37 in a clockwise direction as viewed in FIGURE 8, and end 42b being freely attached to an end of a metal coil 44 as shown in FIGURE 10. The coil 44 encircles a control rod 45 which extends through the front wall of the skirt S terminating in a control knob 46 which holds the rod 45 against longitudinal movement. The knob 46 preferably has a pointer to read upon a calibrated scale concentric with the axis of the knob 46. Rod 45 also has two pins 47 which straddle a turn of the coil 44. As rod 45 is turned about a longitudinal axis, the action of the pins 47 on the coil 44 moves the end 42b so as to rotate the arm 42 about a longitudinal axis. Accordingly, end 42a is actuated to engage the damper plate 37 and station it at a desired position.

Figure 4:
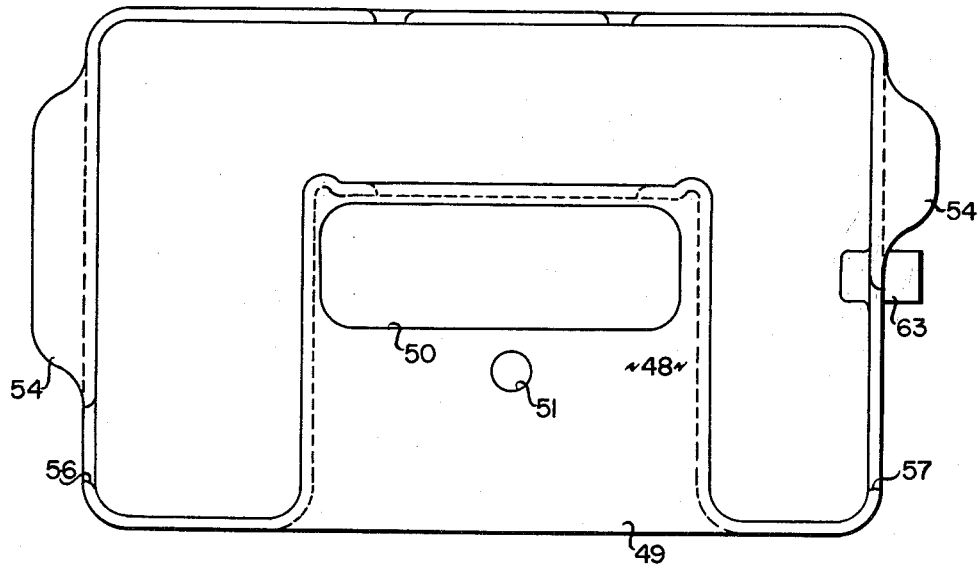
FIGURES 4 and 5 are plan and front views, respectively, of a U-shaped water reservoir.
Figure 5:
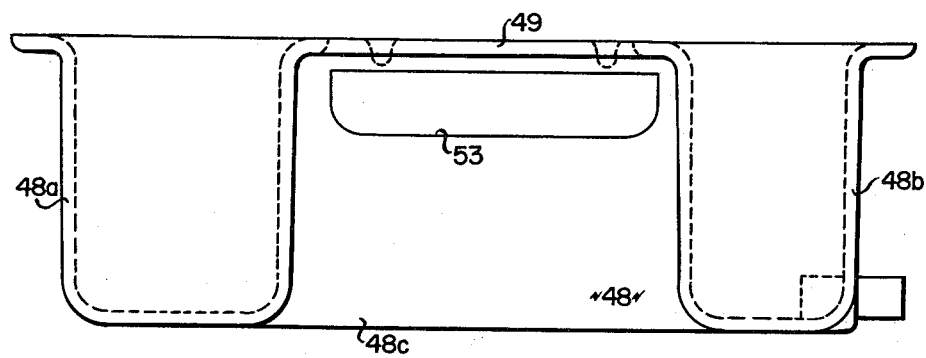
Figures 6, 7:
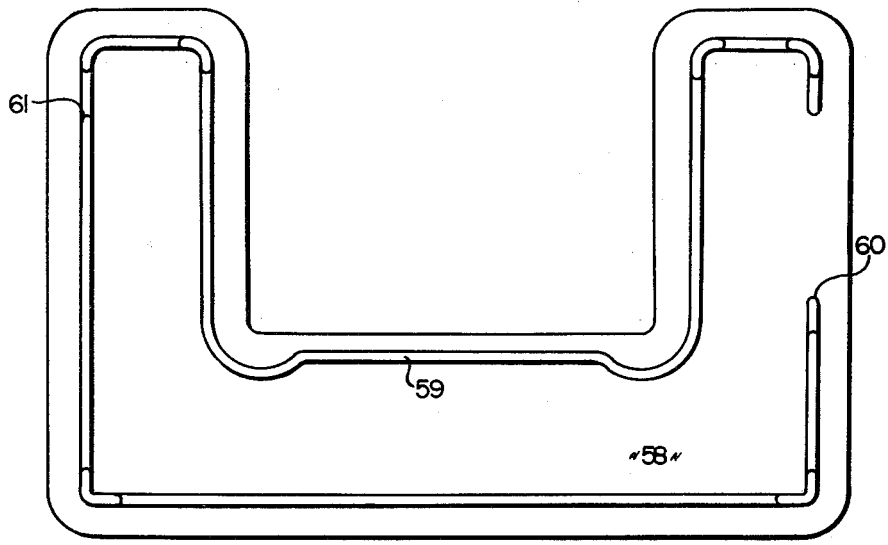
FIGURES 6 and 7 are front and bottom plan views, respectively, of the lid for the water reservoir of FIGURES 4 and 5.

A water reservoir is stationed about the air chamber 35 to entrain moisture in air passing therethrough as determined by the temperature and quantity of such air. As illustrated in FIGURES 4 and 5, one form the water reservoir may take is a U-shaped trough 48, the length of which embraces the sides of the air chamber 35. A web 49 extends from the upper side of one leg 48a to the other leg 48b and has a relatively large rectangular opening 50 and a circular opening 51 so as to leave uncovered, respectively, the openings 36 and the positioning lug 52 (FIGURE 8). The inner wall 48c of the center section of the trough 48 also has an opening 53 to register with the opening 40 of the wall 39 in the air chamber. Finger ledges 54 facilitate removal, as for cleaning, and assembly of the water reservoir about the air chamber 35. Leg 48a of the trough is sufficiently elevated with respect to the actuating arm 42 to permit it to pass beneath the trough and reach the damper plate 37. There are outlets 56 and 57 along the top of the legs of the trough through which air diverted to the reservoir is finally released to the incubator. A lid 58, FIGURES 6 and 7, for the trough 48 has the same general U-shaped configuration. A depending rim 59 of varying height fits within the trough and serves to keep the lid 58 from excessive lateral movement. The rim 59 may be interrupted as at 60 or recessed in height as at 61 so as not to plug the openings 57 and 56, respectively, in the legs of the trough 48.

A flexible hose 62 connects a nipple 63 extending through the leg 48b of the trough to a combination water-fill and level indicator for the trough 48. More particularly, the hose 62 fits over an end of a pipe 64 which is fixed in the front wall of the skirt S. Exteriorly of the skirt portion, the pipe 64 supports a transparent cylindrical housing 65 by passing through aligned openings in the end walls thereof. The housing 65 has an upper opening 66 and is composed preferably of a transparent plastic, for example, a polymethyl methacrylate such as a resin sold under the trade name "Plexiglas." A threaded plug 67 closes the end of the pipe 64. Of that portion of the pipe 64 disposed within the housing 65, there is also an opening 68 communicating with the interior of the housing 65. In this manner, transparent housing 65, which can be of any suitable diameter, serves as an indicator of the level of the water in the trough 48. Also, the reservoir can be readily drained without disassembling the parts by removing the plug 67 and permitting the water to flow out the pipe 64. Conversely, water can be directly added to the trough 48 through the openings 66 and 68 and the connecting hose 62.

The skirt portion S of the incubator also includes adjustable means to support a tray within the incubator. Referring principally to FIGURE 3, a pair of rods 69 and 70, having offset U-shaped medial portions are freely carried for rotation in the front and rear walls of the skirt S. The front ends of the rods have fixed knobs 71 by which the rods are turned about a longitudinally disposed axis. When the offset sections of rods 69 and 70 lay horizontally on stop pins 73 (FIGURE 3), they support tray T in a level position. Pegs 72 fixed to the walls of the skirt S center the tray with respect to the inside walls of the skirt. When rod 69 or 70 is rotated upwardly as far as it is allowed to freely move, one end of the tray T is elevated. In this way the tray T can be set in the inclined position at either end. Lugs 74 permit the skirt portion S to be inserted within a frame of a suitable table which desirably has casters so that handle 75 may be used conveniently to move the incubator.

Referring now to the casing C which partially telescopes the skirt portion S, the former is transparent and may, for example, be fabricated from glass but more desirably is composed of sheets of a plastic, such as polymethyl methacrylate which are heat sealed or adhered by cement along their edges to form the casing.

Figure 2:
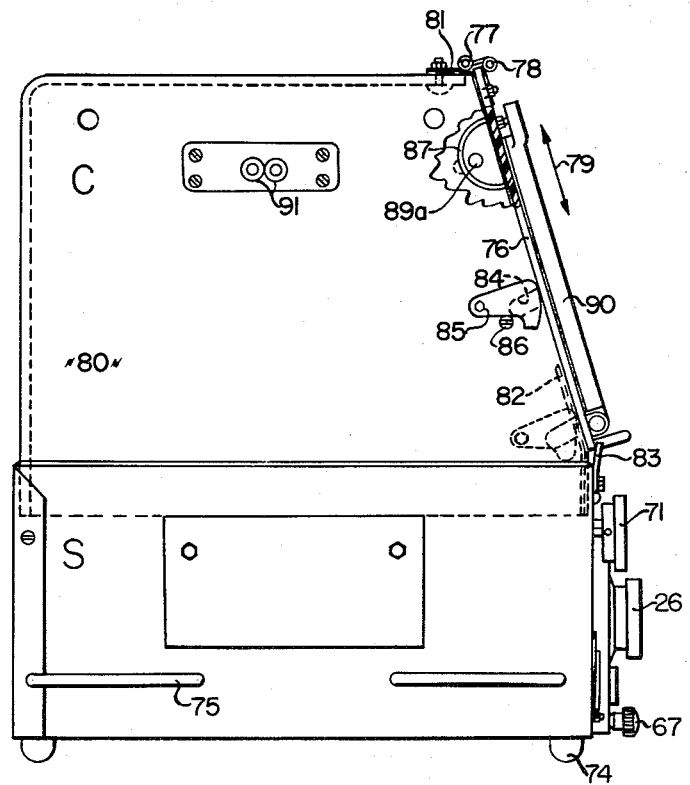

Because of the controlled temperature and humidity conditions extant within an incubator, it is desirable that the incubator door make an effective closure seal. In FIGURES 1 and 2, the door 76 has a double hinge construction at its upper edge shown by hinges 77 and 78. The double hinge construction is important since it enables the door 76 to be slid in opposite directions paralleling the arrow 79 while the door is in contact with the leading edges of the sides or panels 80 of the incubator. The double hinge construction also permits the door 76 to be laid atop the incubator smoothly and with a minimum of protruding edges, and the like. Associated with the hinges 77 and 78 is a thin strip 81 of plastic such as polyethylene which underlies the hinges and extends for a short distance down the forward edges of the sides of the incubator. The strip 81 contributes to an effective seal at that point in the incubator structure.

The lower edge of the door 76 also engages a similar plastic strip 82 which extends along the front of the casing C without reaching the front edges of the side panels 80. The door 76 is thus wedged against the plastic strip 82 by the flared clamps 83 when the door is moved to a downward position. The clamps 83 are fixed to the skirt portion S along the lower edge of the door in its closed position. It will be noted that the ability of the door to move in the plane of the arrow 79 also enables it to engage the flared clamps 83, the latter wedging the door 76 against the plastic strip 82, further to aid in obtaining an effective seal as described.

As a modification, one or more of the side panels 80 have a slot 84 which leads to the forward edge of each of such panels. Normally the slot 84 is covered by a pivotally mounted plate 85 held in a closed position by a stop 86. The advantage of a slot 84 is to permit an infant to be removed from the incubator and any surgical tubing (used for example in intravenous feeding) without having to remove the tubing from the infant.

It often happens that during conditions of high humidity within an incubator, aided by the cooler nursery air contacting the exterior of the incubator, considerable condensation occurs. As a result the incubator literally becomes so fogged that it is difficult to read a thermometer to determine accurately the temperature within the incubator. The present incubator therefore further includes an anti-fog thermometer guard in which a thermometer or similar thermosensing means is isolated within an insulating chamber, so that the thermometer is intermediate the extreme conditions of high humidity within the incubator and the conditions outside the incubator. Referring to FIGURES 1 and 2, the present anti-fog thermometer guard comprises a semi-cylindrical hollow container 87 which is fixed along its plane surface to the inside of the door 76. The container 87 is preferably also composed of a transparent plastic such as polymethyl methacrylate and is conventionally held to the door 76 by screws 88. A thermometer 89 extends through opposite ends of the container 87 so that the bulb or sensing portion 89a of the thermometer reaches into the atmosphere of the incubator. The bulb portion 89a is thus freely exposed to the interior of the incubator while the body portion of the thermometer 89, containing the graduated marks, is insulated from the incubator by the air within the hollow semi-cylinder 87. In this way fogging of the body portion of the thermometer 89 is prevented, and the thermometer can be readily observed through the transparent door 76. Accordingly, this construction not only makes the thermometer easy to read under all conditions of condensation, but this construction eliminates the necessity of entering the incubator to wipe the surface free of moisture in order to reveal the graduated scale on a thermometer. Also, when the incubator door 76, to which the thermometer guard is secured as mentioned, is laid back atop of the incubator, the guard or cylindrical housing 87 protects the thermometer from breakage as when supplies are laid on top of the incubator.

If desired the incubator may have auxiliary equipment known in the art. For example, hand-hole openings in the door 76 may be used and provided with closures and latches, generally indicated at 90, as illustrated in Dorsak and Van Denberg, Patent No. 2,895,760. Or a nebulizer may be attached to tubes 91 as disclosed in Dorsak and Van Denberg Patent No. 2,840,417. Still further, a filter such as is disclosed in Dorsak and Van Denberg application Serial No. 12,748 now Patent No. 3,084,492, may be attached to the inlet hose 32 for the air taken into the incubator.

In operation, the fan 30 draws air from the nursery into the incubator through the hose 32, shroud chamber 31, and then into the air chamber 35 where the air is heated by the coil 24. Depending on the pivotal position of the damper 37, a certain amount of the air is reflected from the damper upwardly through the openings 36 and 50, while the remaining air is diverted through the aligned back openings 40 and 53 into the trough 48 of the water reservoir. Optionally, all of the air can be directed in either of the two indicated paths. In passing through the trough 48 and eventually out the openings 56 and 57, the air picks up the moisture as desired from the water in the reservoir which is also being heated by the coil 24. By controlling the position of the damper 37, which thereby proportions the amount of air passing into the water reservoir, the relative humidity of the air in the incubator can be controlled. The combined air discharge, whether discharged upwardly from the openings 36 and 50 or substantially laterally from the openings 56 and 57 of the trough, strikes against the underside of the tray T which thereby also serves as a baffle or deflecting plate to diffuse the moisture-enriched air together with that released directly through the aligned openings 36 and 50.

Figure 13:
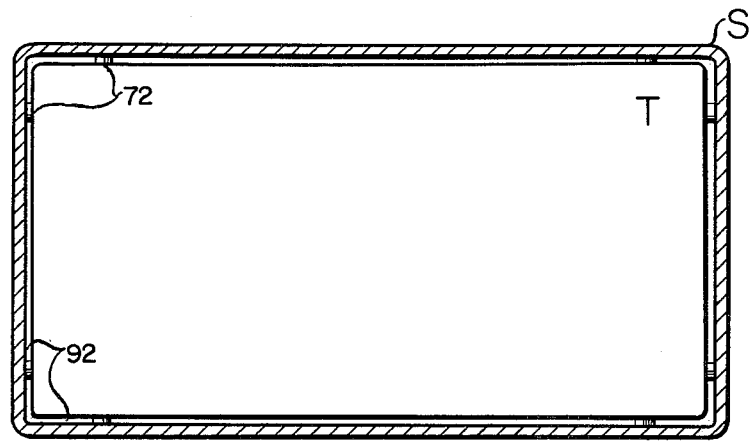
FIGURE 13 is a section of FIGURE 1 on the line XIII—XIII and illustrates the use of a tray, which holds the infant, as a baffle.

It will be noted (FIGURE 13) that the pegs 72 which position the tray T leave a surrounding peripheral trough 92 between the tray and the body of the incubator through which the diffused air reaches the casing C, and that the trough 92 is automatically formed by the pegs 72. Further, as the result of this arrangement, the trough 92 can be partially covered as by a sheet, purposely or accidentally, without seriously affecting the circulating air flow. A certain amount of air exhaust from the casing C is permissible. However, most of the air is drawn back into the shroud chamber 31 by the fan 30 through the openings 34. In this movement, the air passes directly over the thermostat bulbs 27 which serve to regulate the output of heating coil 24 as determined by the setting of the knob 26. The temperature within the casing C can thus be directly controlled.

Other forms embodying the features of the invention may be employed, change being made as regards the features herein disclosed, provided those stated by any of the following claims or the equivalent of such features be employed.

We therefore particularly point out and distinctly claim as our invention:

1. A humidifying unit for an incubator and the like including a housing adapted to be secured to the incubator interiorly thereof, said housing containing air-impelling means and having an air chamber portion extending outwardly therefrom to receice at its inner end air circulated by said air-impelling means, said housing being substantilally completely enclosed except for air inlet means and first and second air outlets in the chamber portion at substantially the remote end thereof, and a water reservoir extending along and encompassing opposite lateral sides of said air chamber along substantially the greater part of the length of said chamber between the inner and outer end thereof, said reservoir having an outlet to the incubator and an opening communicating with only one of said chamber air outlets, and means operable selectively to divide air flow through said air chamber between the first and second air outlets thereof.

2. A compact humidifying unit for an incubator and the like adapted to be readily installed or removed as a unit with respect to such incubator, said unit including shroud and air chambers joined to and communicating with but not containing one another, said shroud chamber being adapted to be secured to the incubator interiorly thereof and substantially enclosed except for an air inlet, said air chamber extending from the shroud chamber into the incubator and being substantially enclosed except for a first outlet on a laterally disposed side thereof and a second outlet on a horizontally disposed side thereof, the latter communicating with the incubator, and a water reservoir supported on said air chamber and shaped to embrace laterally disposed sides of the air chamber in close proximity thereto having an outlet communicating with the incubator and an opening communicating with said first outlet of the air chamber, said water reservoir being generally of U-shaped configuration with the legs thereof having a connecting web portion overlying a horizontally disposed side of the air chamber thereby to support the reservoir with respect to said chamber, damper means mounted within the air chamber selectively to divide air flow between the first and second outlets thereof, and means to vary the position of said damper means to provide a desired relative humidity in the incubator.

3. A compact, integral humidifying and air-flow unit for an incubator and the like; said unit being adapted to be readily installed and removed as a unit with respect to the incubator and comprising an equipment-containing shroud chamber, an integral air-flow chamber, and a water reservoir carried by the air-flow chamber; said shroud chamber being adapted to be secured to the incubator interiorly thereof along a face of the chamber, having: an opening to receive air, a heating coil extending therefrom, impeller-means positioned within the shroud chamber adapted to discharge toward the air-flow chamber, and heating coil-energizing means stationed within the shroud chamber; said air-flow chamber communicating with and being attached to the exterior of the shroud chamber to enclose the heating coil and define therewith a general T-configuration and having a first outlet on a side portion thereof and a second outlet on a top portion thereof, the latter communicating with the incubator, damper means pivotally mounted within the air-flow chamber selectively to divide air flow between the first and second outlets of that chamber, and means effective to vary the pivotal position of said damper means; and said water reservoir being generally U-shaped in horizontal cross-section and having its legs surrounding in close proximity the substantially vertically disposed sides of the air-flow chamber, and having an opening substantially in registery with said first outlet of the air-flow chamber to receive air diverted therethrough.

4. An air-flow unit of claim 3 wherein said shroud chamber includes a further opening to receive recirculating air from the incubator and the like.

5. The humidifying unit of claim 4 wherein said means to vary the position of the damper means includes an arm mounted for pivoting about a longitudinal axis thereof, said arm extending into the air chamber substantially parallel to the axis of rotation of said damper means and having a turned end portion engaging said damper means, and means to rotate said arm to station the damper means at a desired position.

6. A compact humidifying and air-flow unit including a housing, air-impelling means supported within the housing, an air chamber extending from the housing to receive therefrom the discharge of the air-impelling means, a heating coil also disposed within said air chamber, a U-shaped water reservoir supported on said air chamber and forming a trough extending along and in close proximity to the lateral sides of the air chamber and being provided with an outlet, said air chamber having a first opening in one of said lateral sides communicating with the interior of said water reservoir and a second opening in a side non-encompassed by the water reservoir, a damper plate pivotally mounted within the air chamber between said one lateral side and said non-encompassed side to proportion said air discharge between such first and second openings whereby the air directed through such first opening acquires moisture from the water reservoir, and means to vary the pivotal position of the damper plate.

7. A compact control humidifier and air-flow unit for an incubator including a housing adapted to be secured to an incubator interiorly thereof, air-impelling means supported within the housing, a substantially horizontally disposed air chamber extending from the housing to receive therefrom the discharge of the air-impelling means, a heating coil extending from the housing and longitudinally of the air chamber, coil-energizing means carried by the housing, a U-shaped water reservoir supported on said air chamber and having its legs horizontally embracing the exposed lateral sides of said air chamber and being provided with an outlet, said air chamber having a first opening in one of its lateral sides communicating with the interior of said water reservoir and a second opening in an upper face thereof, a damper plate pivotally mounted within the air chamber between said one lateral side and said upper face to proportion said air discharge between such first and second openings whereby the air directed through such first opening acquires moisture from the water reservoir, and means to vary the pivotal position of the damper plate to provide a desired relative humidity within the incubator.

8. In combination: an incubator casing, a tray for holding an infant in a substantially horizontal position supported within the incubator casing and spaced from the walls thereof to define a peripheral trough between the tray and the casing, a compact humidifying and air-flow unit disposed below the tray and including a housing having an opening to receive recirculating air from said casing, air-impelling means supported within the housing, a substantially horizontally disposed air chamber secured to the housing to receive therefrom the discharge of the air-impelling means, a heating coil extending from the housing longitudinally of the air chamber, coil energizing means carried by the housing, a U-shaped water reservoir supported on said air chamber and having its legs horizontally encompassing the exposed lateral sides of said air chamber and being provided with an outlet, said air chamber having a first opening in one of its lateral sides communicating with the interior of said water reservoir and a second opening in an upper face adapted to discharge against the underside of said tray whereby said tray serves as a baffle to provide a diffused air flow, a damper plate pivotally mounted within the air chamber between said one lateral side and said upper face to proportion said air discharge between such first and second opening whereby the air directed through such first opening acquires moisture from the water reservoir, and means to vary the pivotal position of the damper plate and to provide a desired relative humidity in the incubator.

9. An air-flow unit of claim 3 wherein said U-shaped water reservoir further has a web portion connecting its legs, said web portion resting on the air-flow chamber thereby to support the water resevoir.

10. A humidifying unit for an incubator and the like including a housing adapted to be secured to the incubator interiorly thereof, said housing containing air-impelling means and having a cylindrical air chamber portion extending therefrom to receive the discharge of said air-impelling means, said housing being substantially completely enclosed except for air inlet means and first and second air outlets, said outlets being at the remote end of the cylindrical chamber portion, means mounted within the air chamber portion selectively to divide air flow between the first and second air outlets, and a water reservoir positioned contiguous to and around substantially the greater part of the length of cylindrical sidewalls and the end of said chamber portion having an outlet to the incubator and an opening communicating with only one of said chamber air outlets, whereby the water reservoir embraces the air chamber portion prior to such division therein of air flow.

11. In an incubator, a compartment for holding an infant having a pair of side panels and an open side defined between said side panels terminating in straight edges, a door structure for said open side including a door member, a double hinge pivotally securing an upper edge of the door member to the upper edge of said open side so constructed and arranged to place said upper edge physically between the two hinges to permit the door member to be reciprocated in the plane of such open side and against such straight edges, a wedging clamp on the compartment adjacent the lower edge of the door member to engage such lower edge upon downward reciprocation of the door member and urge the member toward said compartment, and plastic strips secured to the compartment and extending along the upper and lower edges of such open face adapted to engage said door member to aid in effecting a seal, wherein at least one of said straight edges of said side panels has a slot to accommodate tubing and the like from outside the incubator to be joined to the infant whereby such infant and tubing may be jointly removed from the incubator without first removing the tubing from the infant and having means selectively to close such slot.

References Cited by the Examiner
UNITED STATES PATENTS

| | | | |
|---|---|---|---|
| 1,155,161 | 9/15 | Ramsey | 16—163 |
| 1,406,926 | 2/22 | Bryan | 73—326 |
| 2,292,120 | 8/42 | Hanby | 128—1.02 |
| 2,600,240 | 6/52 | Grieb | 128—1.02 |
| 2,648,327 | 8/53 | Gibbon | 128—1.02 |
| 2,662,521 | 12/53 | Armstrong | 128—1.02 |
| 2,803,137 | 8/57 | Bradley | 73—363.7 |
| 2,964,947 | 12/60 | De Jong | 73—343 |
| 3,005,673 | 10/61 | Smith et al. | 128—1 |

RICHARD A. GAUDET, *Primary Examiner.*